(12) United States Patent
Park et al.

(10) Patent No.: US 9,097,829 B2
(45) Date of Patent: Aug. 4, 2015

(54) BACKLIGHT UNIT WITH PATTERNED LIGHT GUIDE PANEL

(75) Inventors: Jong Sun Park, Uiwang-si (KR); Kyung Joon Lee, Uiwang-si (KR); Bae Wook Lee, Uiwang-si (KR); Sung Kook Kim, Uiwang-si (KR)

(73) Assignee: CHEIL INDUSTRIES, INC., Gumi-si, Kyeongsangbuk-do (KR)

( * ) Notice: Subject to any disclaimer, the term of this patent is extended or adjusted under 35 U.S.C. 154(b) by 0 days.

(21) Appl. No.: 13/532,847

(22) Filed: Jun. 26, 2012

(65) Prior Publication Data

US 2013/0003415 A1    Jan. 3, 2013

Related U.S. Application Data

(63) Continuation of application No. PCT/KR2010/009234, filed on Dec. 22, 2010.

(30) Foreign Application Priority Data

Dec. 28, 2009 (KR) .................... 10-2009-0132245

(51) Int. Cl.
   *F21V 7/04*     (2006.01)
   *F21V 8/00*     (2006.01)

(52) U.S. Cl.
   CPC ............ *G02B 6/0043* (2013.01); *G02B 6/0038* (2013.01)

(58) Field of Classification Search
   USPC .......... 362/618, 620, 606, 627, 97.3, 311.02, 362/311.04, 311.15, 330, 339, 355
   See application file for complete search history.

(56) References Cited

U.S. PATENT DOCUMENTS

| | | | | |
|---|---|---|---|---|
| 1,437,580 | A * | 12/1922 | Wilson | 428/161 |
| 2,180,114 | A * | 11/1939 | Land | 362/19 |
| 4,573,766 | A * | 3/1986 | Bournay et al. | 349/65 |
| 5,196,960 | A * | 3/1993 | Matsuzaki et al. | 359/453 |
| 5,390,436 | A * | 2/1995 | Ashall | 40/546 |
| 5,999,685 | A * | 12/1999 | Goto et al. | 385/146 |
| 6,130,777 | A * | 10/2000 | Yamashita et al. | 359/456 |
| 6,139,162 | A * | 10/2000 | Masaki | 362/618 |
| 6,572,961 | B1 * | 6/2003 | Koyama et al. | 428/323 |
| 6,906,761 | B2 * | 6/2005 | Nakano | 349/65 |
| 7,199,930 | B2 * | 4/2007 | Yao et al. | 359/619 |
| 7,401,967 | B2 * | 7/2008 | Wei et al. | 362/626 |
| 7,474,464 | B2 * | 1/2009 | Wang et al. | 359/599 |
| 7,594,733 | B2 * | 9/2009 | Goto | 362/97.1 |
| 7,744,235 | B2 * | 6/2010 | Horikoshi et al. | 362/97.4 |
| 7,758,199 | B2 * | 7/2010 | Chang | 362/97.3 |
| 7,914,192 | B2 * | 3/2011 | Coleman | 362/611 |

(Continued)

FOREIGN PATENT DOCUMENTS

| | | |
|---|---|---|
| KR | 10-2005-0045187 A | 5/2005 |
| KR | 10-2006-0096199 A | 9/2006 |
| KR | 10-2009-0022312 A | 3/2009 |

OTHER PUBLICATIONS

International Search Report issued in PCT/KR2010/009234 dated Sep. 29, 2011.

*Primary Examiner* — Ismael Negron
(74) *Attorney, Agent, or Firm* — Lee & Morse, P.C.

(57) ABSTRACT

A patterned light guide panel, a manufacturing method thereof, and a backlight unit including the patterned light guide panel, the patterned light guide panel including a base layer; and a skin layer stacked on the base layer, the skin layer having a lenticular pattern extending orthogonally to a light entrance plane of the light guide panel.

20 Claims, 4 Drawing Sheets

(56) References Cited

U.S. PATENT DOCUMENTS

| | | |
|---|---|---|
| 8,070,346 B2* | 12/2011 | Maeda et al. ................. 362/627 |
| 2006/0209562 A1* | 9/2006 | Lee et al. ..................... 362/606 |
| 2007/0019410 A1* | 1/2007 | Kim et al. .................... 362/235 |
| 2007/0279935 A1* | 12/2007 | Gardiner et al. ............. 362/610 |
| 2008/0310171 A1* | 12/2008 | Hiraishi et al. ............... 362/339 |
| 2010/0085771 A1* | 4/2010 | Lin ............................... 362/606 |

* cited by examiner

Fig. 1

Prior Art

Fig. 7

BACKLIGHT UNIT WITH PATTERNED LIGHT GUIDE PANEL

CROSS-REFERENCE TO RELATED APPLICATION

This application is a continuation of pending International Application No. PCT/KR2010/009234, entitled "Patterned Light Guide Panel, Manufacturing Method Thereof, and LCD Back Light Unit Including the Same," which was filed on Dec. 22, 2010, the entire contents of which are hereby incorporated by reference.

BACKGROUND

1. Field

Embodiments relate to a patterned light guide panel, a manufacturing method thereof, and a backlight unit including the patterned light guide panel.

2. Description of the Related Art

A liquid crystal display (LCD) refers to a device that displays figures or images when an electric field is applied to liquid crystals, which have an intermediate phase between liquid and solid and are injected or provided between two glass substrates in the device. The liquid crystal display device may have various advantages, e.g., light weight, low power consumption, and a slim profile. Such advantageous characteristics of the liquid crystal display devices have led to use thereof in a wide range of applications, e.g., thin TVs, monitors, portable display devices, or the like. For example, in the field of large screen TVs, it may be important to achieve low power consumption and high brightness.

SUMMARY

Embodiments are directed to a patterned light guide panel, a manufacturing method thereof, and a backlight unit including the patterned light guide panel.

The embodiments may be realized by providing a patterned light guide panel including a base layer; and a skin layer stacked on the base layer, the skin layer having a lenticular pattern extending orthogonally to a light entrance plane of the light guide panel.

The lenticular pattern may have a pitch of about 50 µm to about 500 µm, and a height of about 10 µm to about 300 µm.

The skin layer may include particles, the particles having a refractive index in the range of about ±0.1 with respect to a refractive index of the base layer.

The skin layer may have an embossed surface formed by the particles.

The particles may include organic particles, inorganic particles, or a mixture thereof.

The particles may be included in the skin layer in an amount of about 0.5 wt % to about 50 wt %, based on a total weight of the skin layer.

The base layer and the skin layer may be formed by co-extrusion.

The patterned light guide panel may further include a lower skin layer on the base layer.

The lower skin layer may be on a side of the base layer opposite to the skin layer.

The lower skin layer may include particles, the particles having a refractive index in the range of about ±0.1 with respect to a refractive index of the base layer.

The lower skin layer may have an embossed surface formed by the particles.

The particles may include organic particles, inorganic particles, or a mixture thereof.

The particles may be included in the lower skin layer in an amount of about 0.5 wt % to about 50 wt %, based on a total weight of the lower skin layer.

The embodiments may also be realized by providing a method of fabricating a patterned light guide panel, the method including co-extruding a transparent resin for forming a base layer and a resin pellet for forming a skin layer to form a laminate film of the base layer and the skin layer; and forming a lenticular pattern on the skin layer by passing the film through rolls such that the skin layer of the film faces a pattern roll having an engraved lenticular pattern.

The resin pellet for forming the skin layer may include particles having a refractive index in a range of about ±0.1 with respect to that of the transparent resin and the base layer.

The embodiments may also be realized by providing a backlight unit comprising the patterned light guide panel according to an embodiment.

The backlight unit may further include a diffuser film, wherein the skin layer has a stationary friction of about 0.01 N to about 20 N.

The skin layer may have a stationary friction of about 0.01 N to about 1 N.

BRIEF DESCRIPTION OF THE DRAWINGS

Features will become apparent to those of ordinary skill in the art by describing in detail exemplary embodiments with reference to the attached drawings in which.

DETAILED DESCRIPTION

Korean Patent Application No. 10-2009-0132245, filed on Dec. 28, 2009, in the Korean Intellectual Property Office, and entitled: "Patterned Light Guide Panel, Manufacturing Method Thereof, and LCD Back Light Unit Including the Same," is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

Figure 1:
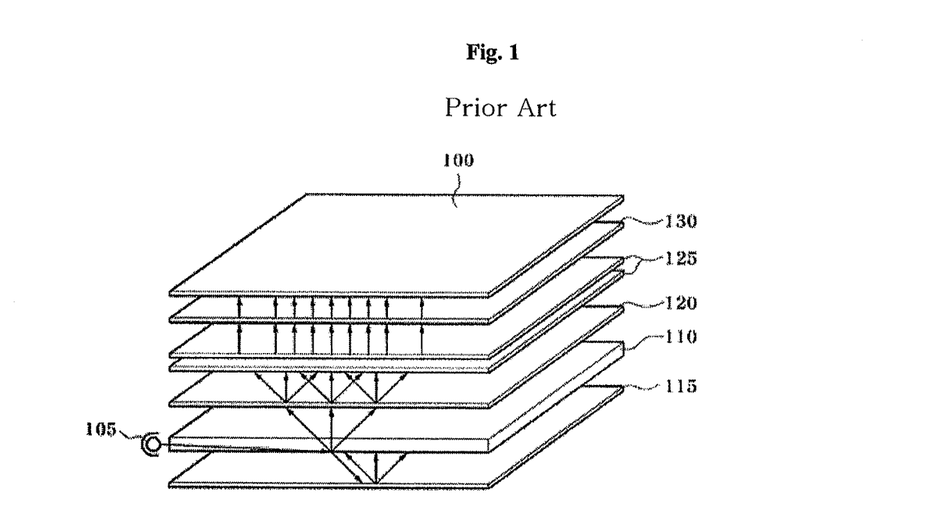
FIG. 1 illustrates an exploded perspective view of an edge-lit type backlight unit for a liquid crystal display device.

LED TVs, e.g., LED-backlit LCD TVs, may employ an edge-lit type backlight unit. FIG. 1 illustrates an exploded perspective view of one type of edge-lit backlight unit for a liquid crystal display device. The edge-lit backlight unit of the liquid crystal display may include a light source 105, a light guide panel 110, a light reflection film 115, a diffuser film 120, prism films 125, and a protection sheet 130. For example, some light emitted from a light source 105 located at a side of the backlight unit may be totally reflected inside the light guide panel 110, and other light may be extracted from the light guide panel 110 through scattering by the light reflection film 115 on a lower surface of the light guide panel 110. The light extracted at low angle from the light guide panel 110 may be collimated through the diffuser film 120 and may be finally collected by the prism films 125. The protection sheet 130 may be provided to the light guide panel 110 to protect the light guide panel from scratches or abrasion. A liquid crystal display panel 100 may be on the protection sheet 130.

Figure 2:
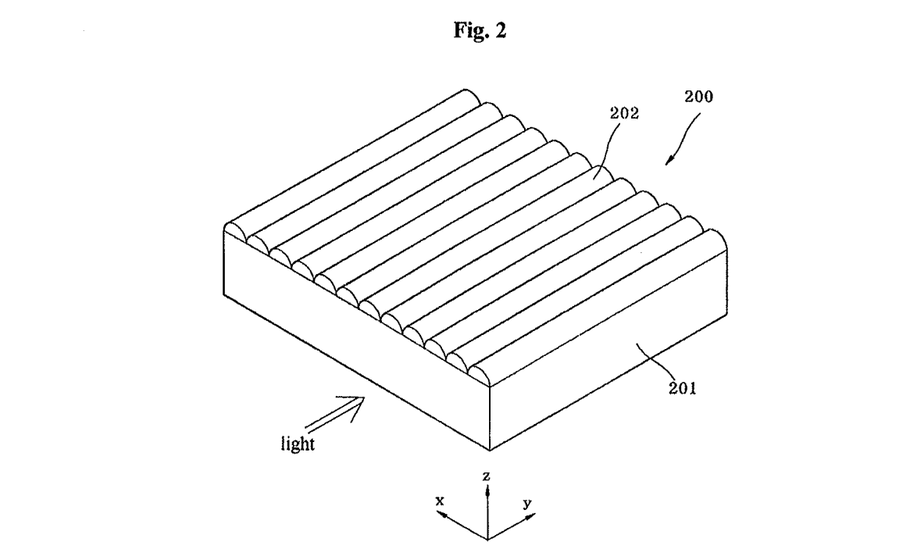
FIG. 2 illustrates a perspective view of a patterned light guide panel according to an embodiment.

FIG. 2 illustrates a perspective view of a patterned light guide panel according to an embodiment.

As shown in FIG. 2, the patterned light guide panel 200 according to the present embodiment may include a base layer 201 and a skin layer 202 stacked on the base layer 201. The skin layer 202 may have a lenticular pattern formed thereon.

The base layer 201 may be composed of an optically transparent resin. The optically transparent resin may be selected from the group of, e.g., (meth)acrylic resins, polycarbonate resins, styrene resins, olefin resins, polyester resins, or the like. The optically transparent resin may be used alone or in a combination of two or more thereof. In an implementation, the olefin resins may include cyclic olefin resins, and the polyester resins may include amorphous polyester resins.

In an implementation, methacrylic resin may be used as the optically transparent resin. Examples of suitable methacrylic resins may include methyl methacrylate, ethyl methacrylate, butyl methacrylate, cyclohexyl methacrylate, benzyl methacrylate, 2-ethyl-hexyl methacrylate, 2-hydroxy ethyl methacrylate, phenyl methacrylate, chlorophenyl methacrylate, or the like. For example, methyl methacrylate resins having high transmittance may be advantageously used.

The methacrylic resin may be copolymerized with a monofunctional unsaturated monomer. In an implementation, the methacrylic resin may be copolymerized with about 40 wt % or less of the monofunctional unsaturated monomer, e.g., about 30 wt % or less of the monofunctional unsaturated monomer or about 20 wt % or less of the monofunctional unsaturated monomer.

The monofunctional unsaturated monomer copolymerized with the methacrylic resin may include, e.g., an acrylic ester compound selected from the group of ethyl methacrylate, butyl methacrylate, cyclohexyl methacrylate, benzyl methacrylate, 2-ethyl hexyl methacrylate, 2-hydroxy ethyl methacrylate, phenyl methacrylate, chlorophenyl methacrylate, methyl acrylate, ethyl acrylate, butyl acrylate, cyclohexyl acrylate, phenyl acrylate, benzyl acrylate, 2-ethyl hexyl acrylate, and 2-hydroxy ethyl acrylate.

Examples of monofunctional unsaturated monomers copolymerizable with the methacrylic resins may include an unsaturated acid compound such as methacrylic acid and acrylic acid, styrene, acrylonitrile, maleic anhydride, phenylmaleimide, cyclohexylmaleimide, or the like. The monofunctional unsaturated monomers may be used alone or in a combination of two or more thereof.

The skin layer 202 may have a lenticular pattern. In an implementation, the pattern may extend orthogonal to a light entrance plane of the light guide panel. In an implementation, referring to FIG. 2, the light source may be arranged in parallel with the X-axis to emit light through an X-Z plane. The lenticular pattern may be arranged in the Y-axis axis, e.g., orthogonal to a light entrance plane, e.g., the X-Z plane.

Figure 3:
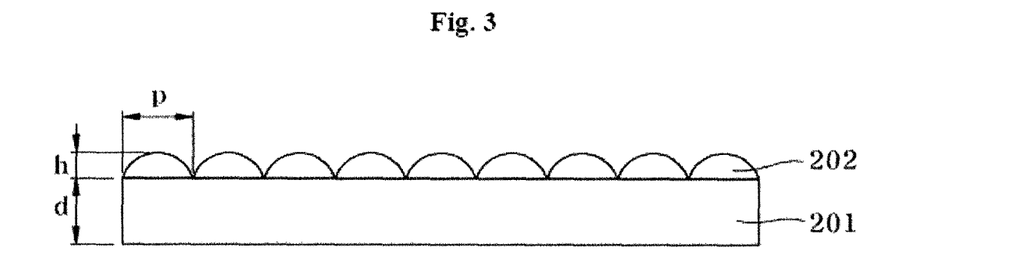
FIG. 3 illustrates a schematic cross-sectional view of the patterned light guide panel of FIG. 2.

FIG. 3 illustrates a schematic cross-sectional view of the patterned light guide panel of FIG. 2. The skin layer 202 of the patterned light guide panel may be formed with the lenticular pattern, e.g., a pattern of lenses, each having a semicircular cross-section.

The lenticular pattern may have a predetermined pitch "p" and a predetermined height "h". In an implementation, each lens may be a hemi-cylindrical type lens. In an implementation, the lenses of the lenticular pattern may have a pitch "p" of about 50 μm to about 500 μm. For example, the lenses of the lenticular pattern may have a pitch "p" of about 100 μm to about 300 μm or about 100 μm to about 200 μm. Within this pitch range, the lenticular pattern may advantageously help reduce friction as well as appearance of bright lines at a light entrance part caused by light from LED lamps.

In the lenticular pattern, the lenses may have a height "h" of about 10 μm to about 300 μm. Within this range, the lenticular pattern may advantageously help reduce friction and appearance of bright lines. In an implementation, the lenses of the lenticular pattern may have a height "h" of about 50 μm to about 200 μm. For example, the lenses of the lenticular pattern may have a height "h" of about 50 μm to about 150 μm or about 50 μm to about 100 μm.

In an implementation, the lenses of the lenticular pattern may be formed with no separation therebetween. Forming the lenses of the lenticular pattern with no separation therebetween may help prevent an increase in friction and may help prevent bright lines from being visible at the light entrance part. In an implementation, the lenses of the lenticular pattern may be formed to have a separation therebetween. For example, a distance between the lenses may be less than or equal to about 100 μm to help minimize recognition of the bright lines and the friction.

The skin layer 202 may be formed of the same material as or a different material from the base layer 201. In an implementation, the skin layer 202 may include the optically transparent resin. Examples of suitable optically transparent resin may include (meth)acrylic resins, polycarbonate resins, styrene resins, olefin resins, polyester resins, and the like.

In an implementation, the modified skin layer 203 may include the optically transparent resin as well as particles 212. The particles 212 may have a refractive index in a range of about ±0.1 with respect to that of the base layer 201. For example, the refractive index of the particles 212 may be about 0.1 less to about 0.1 greater than the refractive index of the base layer 201.

Figure 4:
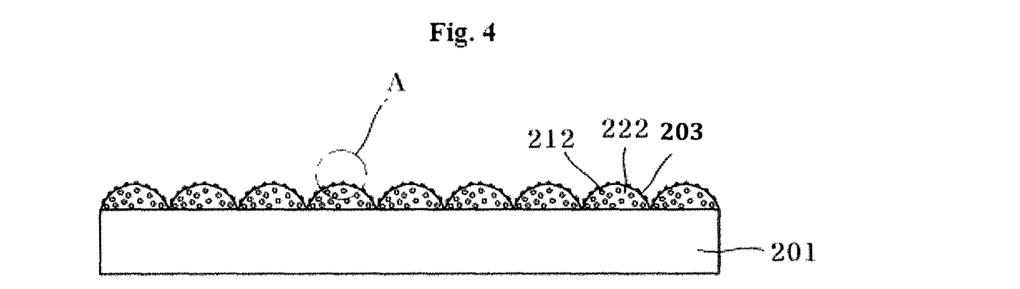
FIG. 4 illustrates a cross-sectional view of a patterned light guide panel according to an embodiment.
Figure 5:
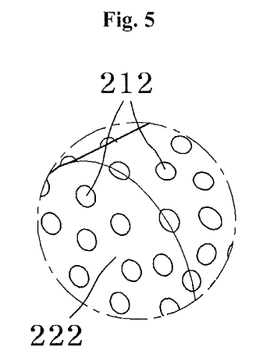
FIG. 5 illustrates an enlarged cross-sectional view of Part A in FIG. 4.

FIG. 4 illustrates a cross-sectional view of a patterned light guide panel according to an embodiment. FIG. 5 illustrates an enlarged cross-sectional view of Part A in FIG. 4. As shown in FIGS. 4 and 5, the modified skin layer 203 may include the particles 212. For example, the modified skin layer 203 may have an embossed surface formed by the particles 212. Accordingly, the modified skin layer 203 may provide good slip properties to the light guide panel. The particles 212 may be evenly or unevenly dispersed in a matrix 222, which may be formed of an optically transparent resin. The optically transparent resin used for the matrix 222 of the modified skin layer 203 may be the same as or different from the optically transparent resin of the base layer 201.

The particles 212 may have a smaller size than the pitch "p" of the lenses of the lenticular pattern. For example, the particles 212 may have a particle diameter of about 1 µm to about 100 µm or about 1 µm to about 50 µm. Within this particle diameter range, the particles may facilitate effective scattering of light and may help provide excellent slip properties with respect to the film.

The particles 212 may include organic particles, inorganic particles, or a mixture thereof. In an implementation, the particles 212 may include, e.g., silica particles, acrylic particles, styrene particles, calcium carbonate particles, aluminum oxide particles, methacrylic particles, polycarbonate particle, olefin particles, polyester particles, siloxane particles, or the like. The particles 212 may be used alone or in a combination of two or more thereof.

Acrylic crosslinked particles may be particularly advantageous. The acrylic crosslinked particles may include polymer particles prepared from a composition including about 50 wt % of an acrylic monofunctional monomer. For example, the polymer particles may be selected from the group of high molecular weight polymer particles obtained by copolymerization of acrylic monofunctional monomers; high molecular weight polymer particles obtained by copolymerization of an acrylic monofunctional monomer and other monofunctional monomers; cross-linked polymer particles obtained by copolymerization of an acrylic monofunctional monomer and a multifunctional monomer; and cross-linked polymer particles obtained by copolymerization of an acrylic monofunctional monomer, other monofunctional monomers, and multifunctional monomers.

Examples of the acrylic monofunctional monomer may include methacrylic esters such as methyl methacrylate, ethyl methacrylate, butyl methacrylate, cyclohexyl methacrylate, phenyl methacrylate, benzyl methacrylate, 2-ethyl hexyl methacrylate, and 2-hydroxy ethyl methacrylate; acrylic esters such as methyl acrylate, ethyl acrylate, butyl acrylate, cyclohexyl acrylate, phenyl acrylate, benzyl acrylate, 2-ethyl hexyl acrylate, and 2-hydroxy ethyl acrylate; methacrylic acid, acrylic acid, ad the like. The acrylic monofunctional monomers may be used in a combination of two or more thereof.

In an implementation, the acrylic particles may have a refractive index of about 1.46 to about 1.55. For example, the refractive index be changed or selected according to a composition of the particle.

In an implementation, siloxane particles may be used. The siloxane particles may include a polymeric siloxane (which may be referred to as silicone rubber or silicone resin), and may have a solid phase at room temperature. The siloxane polymer may be obtained by hydrolysis and condensation of chlorosilanes, e.g., dimethyldichlorosilane, diphenyldichlorosilane, phenylmethyldichlorosilane, methyltrichlorosilane, and/or phenyltrichlorosilane. The siloxane polymer may be a crosslinked polymer in which two or three organic groups are coupled to one silicon atom.

In an implementation, the siloxane particles may have a refractive index of about 1.40 to about 1.47. For example, the refractive index of the siloxane particles may be changed or selected according to a composition thereof. As a density of phenyl group increases in the particles, or a density of organic group coupled with a silicon atom increases, the refractive index of the particles may increase.

The particles 212 may be included in the modified skin layer 203 in an amount of about 0.5 to about 50 wt %, e.g., about 1 to about 40 wt % or about 5 to about 30 wt %, based on a total weight of the modified skin layer 203. Maintaining the amount of the particles 212 within this range may help ensure that the light guide panel can be produced through process manufacturing while minimizing friction.

In the patterned light guide panel according to an embodiment, the skin layer 202 may have a stationary friction of about 0.01 to 20 N. In an implementation, the skin layer 202 may have a stationary friction of about 0.01 to 1 N. Within this range of the stationary friction of the skin layer 202 with respect to the diffuser film, slip properties between the light guide panel and the diffuser film adjacent thereto may be improved.

The friction may be measured at a line speed of about 300 mm/min with the same products, e.g., two patterned light guide panels, placed on a surface of the skin layer 202 and a weight of 500 g placed on the patterned light guide panel.

In an implementation, the base layer 201 may have a thickness "d" of about 1 to about 7 mm, e.g., about 2 to about 4 mm. In an implementation, a ratio of the thickness "d" of the base layer 201 to the height "h" of the skin layer 202 may be about 500:1 to about 10:1. For example, the ratio may be about 100:1 to about 10:1. Maintaining the ratio within these ranges may help ensure that the light guide panel provides excellent optical properties and can be produced through process manufacturing.

Figure 6:
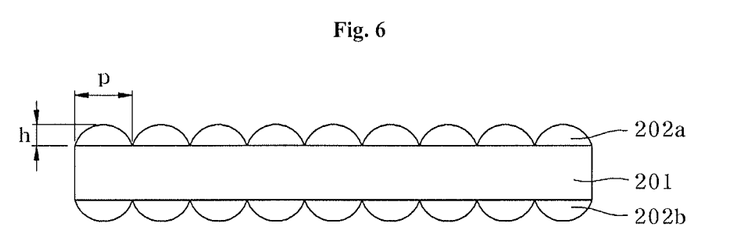
FIG. 6 illustrates a cross-sectional view of a patterned light guide panel according to an embodiment.

In an embodiment, an additional skin layer may be provided under the base layer. FIG. 6 illustrates a cross-sectional view of a patterned light guide panel according to an embodiment. For example, the patterned light guide panel may include an upper skin layer 202a (at an upper surface of a base layer 201) and a lower skin layer 202b (at a lower side of the base layer 201, e.g., opposite to the upper skin layer 202a). When the skin layers 202a, 202b are formed on the upper and lower surfaces of the base layer 201, the light guide panel may have low friction and may reduce an angle of light extraction and bright lines.

The upper skin layer 202a and/or the lower skin layer 202b may be formed of the same material as or a different material from the base layer 201. In an implementation, the upper skin layer 202a and/or the lower skin layer 202b may include the optically transparent resin. Examples of suitable optically transparent resin may include (meth)acrylic resins, polycarbonate resins, styrene resins, olefin resins, polyester resins, and the like.

In an implementation, the upper skin layer 202a and/or the lower skin layer 202b may include the optically transparent resin as well as particles 212. The particles 212 may have a refractive index in a range of about ±0.1 with respect to that of the base layer 201. For example, the refractive index of the particles 212 may be about 0.1 less to about 0.1 greater than the refractive index of the base layer 201.

Further, although not shown in the drawings, the upper and lower skin layers 202a, 202b may further include particles 212 as described above.

In an implementation, the base layer 201 may include a skin layer 202 having a lenticular pattern at an upper side thereof with, and a light diffusion layer at a lower side thereof. The light diffusion layer may include a light diffusing agent.

In an implementation, the base layer 201 may include a skin layer 202 having a lenticular pattern at the upper side thereof, and a prism pattern (not shown) at the lower side thereof.

Another embodiment provides a method of fabricating a patterned light guide panel. In the method, the patterned light guide panel may be formed by co-extrusion. Co-extrusion of a base layer 201 and a skin layer 202 may help increase and/or ease production of the light guide panel. Further, the co-extrusion method may facilitate an improvement in optical characteristics and slip properties of the light guide panel without changing existing equipment.

In an implementation, the method may include co-extruding a transparent resin (for forming the base layer 201) and a resin pellet (for forming the skin layer 202) to form a laminate film of the base layer 201 and the skin layer 202. Then, a lenticular pattern may be formed on the skin layer 202 by passing the film through rolls such that the skin layer 202 of the film faces a pattern roll having an engraved or embossed lenticular pattern formed thereon In an implementation, the resin pellet for forming the skin layer 202 may include particles that have a refractive index in the range of about ±0.1 from that of the transparent resin and/or the base layer. For example, the particles may have a refractive index of about 0.1 less than to about 0.1 greater than that of the transparent resin and/or the base layer. In an implementation, the particles may be provided by a master batch for efficiency in dispersion before extrusion. Thus, the particles may be advantageously evenly dispersed on the skin layer.

An embodiment provides a backlight unit, e.g., a LCD backlight unit, including the patterned light guide panel as described above. The backlight unit may have no protective film on the skin layer of the patterned light guide panel.

Figure 7:
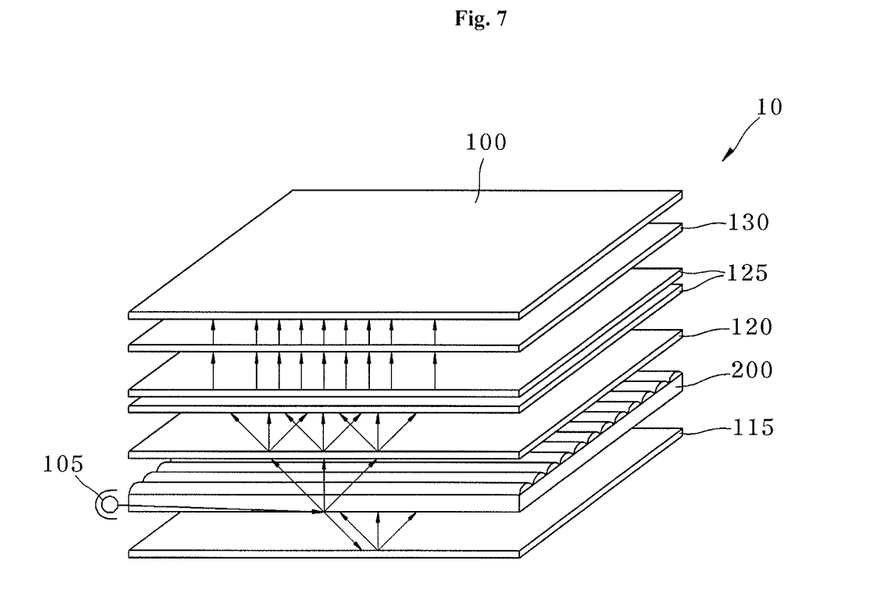
FIG. 7 illustrates an exploded perspective view of an edge-lit type backlight unit for a liquid crystal display device according to an embodiment.

FIG. 7 illustrates an exploded perspective view of an edge-lit backlight unit for a liquid crystal display device according to an embodiment. The edge-lit backlight unit 10 of the liquid crystal display may include a light source 105, the patterned light guide panel 200 according to an embodiment, a light reflection film 115, a diffuser film 120, prism films 125, and a protection sheet 130. A liquid crystal display panel 100 may be on the protection sheet 130.

The following Examples and Comparative Examples are provided in order to set forth particular details of one or more embodiments. However, it will be understood that the embodiments are not limited to the particular details described. Further, the Comparative Examples are set forth to highlight certain characteristics of certain embodiments, and are not to be construed as either limiting the scope of the invention as exemplified in the Examples or as necessarily being outside the scope of the invention in every respect.

EXAMPLE 1

7.5 parts by weight of acrylic crosslinked particles having an average particle size of 30 μm (MBX30®, Sekisui Co., Ltd.) was added to 100 parts by weight of poly(methyl)methacrylate (PMMA) resin (EXN®, Sumitomo Co., Ltd.), followed by extrusion under clean room conditions to prepare pellets. The pellets were melted through a first extruder having a diameter of 50 mm, and PMMA resin (EXN®, Sumitomo Co., Ltd.) was melted through a second extruder having a diameter of 150 mm to prepare a 6 mm thick two-layer film including a base layer and a skin layer. Here, an extrusion ratio of the first extruder to the second extruder was set to 1:100. Further, a ratio of the thickness of the skin layer to a thickness of the base layer was set to 1:100. After passing through a T-die, the two-layer resin film melted through the extruders was cooled by a pattern roll having an engraved lenticular pattern to form a lenticular pattern on the film, thereby preparing a patterned light guide panel. The lenticular pattern had a pitch "p" of 200 μm and a height "h" of 100 μm.

COMPARATIVE EXAMPLE 1

A general light guide panel (LXN 865, Mitsubishi Rayon Co., Ltd.) with no pattern was used.

COMPARATIVE EXAMPLE 2

The light guide panel for Comparative Example 2 had the same configuration as that of Example 1 except that the light guide panel had a prism pattern having a pitch "p" of 200 μm and a height "h" of 100 μm.

(1) Friction (N): The two identical light guide panels were stacked together and rubbed together to measure friction using a surface property tester (obtained from HEIDON Co., Ltd.). The friction was measured using a weight of 500 g at a line speed of 300 mm/min.

(2) Angle of light extraction (degree): With the prepared light guide panel disposed in a BLU for a 40-inch LED TV, an angle of light extraction was measured using a protractor when light was emitted from a single LED lamp to the light guide panel. No film was disposed on the light guide panel during measurement.

Results are listed in Table 1.

TABLE 1

|  | | Stationary friction (N) | Dynamic friction (N) | Angle of light extraction (degree) |
|---|---|---|---|---|
| Example | 1 | 0.102 | 0.135 | 36 |
| Comparative Example | 1 | Exceeding 20 (measurement impossible) | Exceeding 20 (measurement impossible) | 67 |
|  | 2 | 1.267 | 1.470 | 21 |

As shown in Table 1, it may be seen that Example 1 had significantly lower coefficients of friction, e.g., had significantly lower stationary and dynamic friction values, than Comparative Examples 1 and 2. Further, it may be seen that Example 1 had a light extraction angle of less than 40 degrees, thereby facilitating or enabling one-dimensional dimming.

By way of summation and review, a backlight unit may have an impact on the improvement in power consumption and high brightness. For example, when a screen displays a dark scene or an image with a dark portion, illumination of the dark scene or dark portion may not only result in unnecessary power consumption but may also deteriorate image quality and may cause an increase in temperature of the backlight unit and a display module, thereby shortening a lifespan of the LCD device. Large TVs may suffer from severe power consumption and temperature increase. Thus, it may be desirable to decrease an average backlight level as much as possible.

Dimming or scanning techniques may be considered. In a one-dimensional dimming technique, a contrast ratio of the screen may be increased to help improve image quality of the screen while reducing power consumption by about 30% or more. For one-dimensional dimming or scanning in an LCD or LED TV, a light guide panel may be configured to allow light entering a mirror surface of the light guide panel to be extracted from the light guide panel through total reflection at low angles of incidence. However, a printed light guide panel may not be suited for one-dimensional line dimming. For example, printed dots of the light guide panel may cause light (of an LED backlight unit) to be extracted at a wide angle through diffusive reflection.

Backlight units may include a direct-lit type backlight unit and an edge-lit type backlight unit. In the direct-lit type backlight unit, lamps may be arranged below a liquid crystal panel to emit light thereto. In the edge-lit type backlight unit, a light guide panel may be disposed below the liquid crystal panel, and light may be irradiated to a mirror plane of the light guide panel.

Various kinds of films or sheets in a backlight unit may cause an increase in assembly costs and sheet costs. Accordingly, combination of the films, light guide panel, and diffuser film has been considered. However, the combined the light guide panel may involve not only an increase in manufacturing costs due to low productivity, but may also result in a deterioration in quality such as viewing angle, dark sections, and the like. Further, a combined film having both a prism function and a diffusion function may not include the diffuser film. Thus, sheet crumpling may occur due to an increase in friction between an upper part of the light guide panel and a lower part of the combined film.

Accordingly, the embodiments provide a light guide panel, which may not be susceptible to external scratching or other damage even without the protective film, which facilitates a reduction in manufacturing costs by elimination of the protective film while providing high productivity, and which is advantageous in one-dimensional dimming and scanning by allowing light emitted from a light source towards the light guide panel to be extracted at low angle from the light guide panel through a surface pattern of the light guide panel.

The embodiments provide a patterned light guide panel having a lenticular pattern formed on a skin layer of the light guide panel.

The embodiments provide a patterned light guide panel that exhibits excellent slip properties to eliminate the need for a protective film.

The embodiments provide a patterned light guide panel that is not susceptible to scratches or other cutting damage, even without the protective film.

The embodiments provide a patterned light guide panel that facilitates a reduction in manufacturing costs by elimination of the need for a protective film.

The embodiments provide a patterned light guide panel that is advantageous in one-dimensional dimming and scanning by allowing light emitted from a light source towards the light guide panel to be extracted at low angle from the light guide panel.

The embodiments provide a patterned light guide panel that has improved characteristics in terms of reliability, light leakage at a light entrance part, even brightness, particularly, a reduction of bright lines of an LED light source, and processability.

The embodiments provide a method of fabricating a patterned light guide, which employs a co-extrusion process and has at least five times the productivity of an injection process.

The embodiments provide a method of fabricating a patterned light guide which employs the co-extrusion process to fabricate the patterned light guide panel without changing existing equipment.

The embodiments provide a backlight unit having no protective film on the skin layer of the patterned light guide panel.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A patterned light guide panel, comprising:
   a base layer; and
   a skin layer stacked on the base layer, the skin layer having a lenticular pattern extending orthogonally to a light entrance plane of the light guide panel,
   wherein:
   a light source is arranged to emit light through an X-Z plane of the patterned light guide panel, and the lenticular pattern is arranged in a Y-axis,
   the skin layer includes particles, the particles having a refractive index in the range of about ±0.1 with respect to a refractive index of the base layer, and
   a ratio of the thickness of the base layer to the height of the skin layer is about 100:1 to about 10:1.

2. The patterned light guide panel as claimed in claim 1, wherein the lenticular pattern has:
   a pitch of about 50 μm to about 500 μm, and
   a height of about 10 μm to about 300 μm.

3. The patterned light guide panel as claimed in claim 1, wherein the particles are included in the skin layer in an amount of about 0.5 wt % to about 50 wt %, based on a total weight of the skin layer.

4. The patterned light guide panel as claimed in claim 1, wherein the base layer and the skin layer are in direct contact with one another.

5. The patterned light guide panel as claimed in claim 1, wherein the base layer and the skin layer are in direct planar contact with one another.

6. The patterned light guide panel as claimed in claim 1, wherein the skin layer has an embossed surface formed by the particles.

7. The patterned light guide panel as claimed in claim 6, wherein the particles include organic particles, inorganic particles, or a mixture thereof.

8. The patterned light guide panel as claimed in claim 1, further comprising a lower skin layer on the base layer.

9. The patterned light guide panel as claimed in claim 8, wherein the lower skin layer is on a side of the base layer opposite to the skin layer.

10. A backlight unit comprising the patterned light guide panel as claimed in claim 1 and a diffuser film.

11. The backlight unit as claimed in claim 10, further comprising a lower skin layer on the base layer,
    wherein the lower skin layer includes particles, the particles having a refractive index in the range of about ±0.1 with respect to a refractive index of the base layer.

12. The backlight unit as claimed in claim 10, wherein the skin layer has a stationary friction of about 0.01 N to about 20 N.

13. The backlight unit as claimed in claim 12, wherein the skin layer has a stationary friction of about 0.01 N to about 1 N.

14. A patterned light guide panel, comprising:
    a base layer;
    a skin layer stacked on the base layer, the skin layer having a lenticular pattern extending orthogonally to a light entrance plane of the light guide panel, and
    a lower skin layer on the base layer,
    wherein:
    the lower skin layer includes particles, the particles having a refractive index in the range of about ±0.1 with respect to a refractive index of the base layer.

15. The patterned light guide panel as claimed in claim 14, wherein the lower skin layer has an embossed surface formed by the particles.

16. The patterned light guide panel as claimed in claim 14, wherein the particles include organic particles, inorganic particles, or a mixture thereof.

17. The patterned light guide panel as claimed in claim 14, wherein the particles are included in the lower skin layer in an amount of about 0.5 wt % to about 50 wt %, based on a total weight of the lower skin layer.

18. A method of fabricating a patterned light guide panel, the method comprising:
  co-extruding a transparent resin for forming a base layer and a resin pellet for forming a skin layer to form a laminate film of the base layer and the skin layer, the skin layer being a different material from the base layer; and
  forming a lenticular pattern on the skin layer by passing the film through rolls such that the skin layer of the film faces a pattern roll having an engraved lenticular pattern, wherein:
  the skin layer includes particles, the particles having a refractive index in the range of about ±0.1 with respect to a refractive index of the base layer.

19. The method as claimed in claim 18, wherein the resin pellet for forming the skin layer includes the particles.

20. A method of fabricating a patterned light guide panel, the method comprising:
  co-extruding a transparent resin for forming a base layer and a resin pellet for forming a skin layer to form a laminate film of the base layer and the skin layer; and
  forming a lenticular pattern on the skin layer by passing the film through rolls such that the skin layer of the film faces a pattern roll having an engraved lenticular pattern, the method further comprising forming a lower skin layer on the base layer, the lower skin layer including particles, the particles having a refractive index in the range of about ±0.1 with respect to a refractive index of the base layer.

* * * * *